MARSHALL LEFFERTS.
Improvement in Chemical Electric-Telegraphs.
No. 114,692.          Patented May 9, 1871.
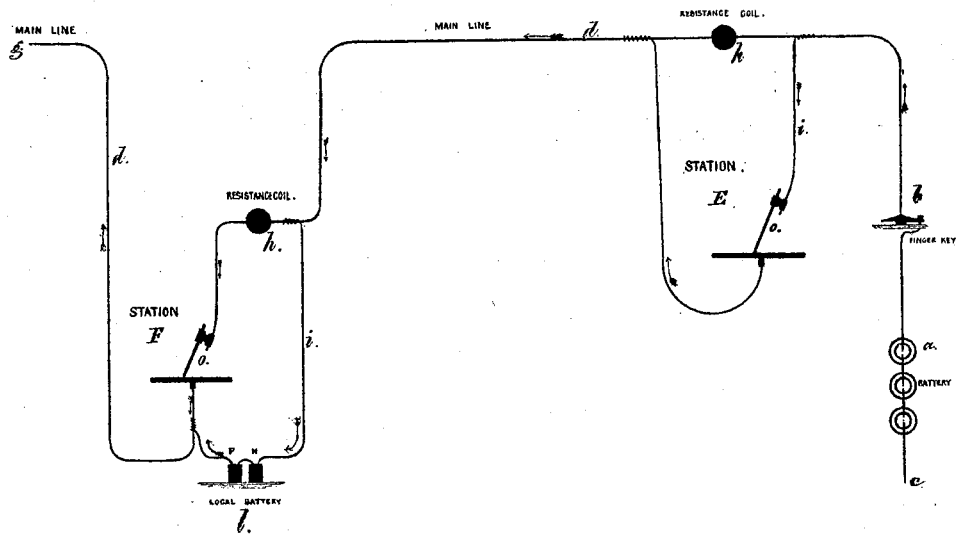

UNITED STATES PATENT OFFICE.

MARSHALL LEFFERTS, OF NEW YORK, N. Y.

IMPROVEMENT IN CHEMICAL ELECTRIC TELEGRAPHS.

Specification forming part of Letters Patent No. 114,692, dated May 9, 1871.

*To all whom it may concern:*

Be it known that I, MARSHALL LEFFERTS, of the city and State of New York, have invented and made an Improvement in Electrical Telegraphs; and the following is hereby declared to be a correct description of the same.

In chemical telegraphs a difficulty has existed in taking more than one copy of the message in any one circuit because the resistance to the pulsation in passing through the chemically-prepared material has been such as to weaken the pulsation going to the next station, rendering the second copy indistinct and unreliable; or, if the second copy was of proper character, the first being too dark, the marks spreading into each other or the paper being burnt. Besides this, telegraphic characters, at times, are not distinctly made, being drawn out to a fine line, due to the gradual electrical subsidence or a lateral current.

My invention is designed to obviate these difficulties by the use of a "shunt" or derived circuit in the main line to divert a portion of the current through the instrument, the remainder passing onto the next, by placing a resistance-coil in the main line, between the points of connection of the shunt, and proportioning the resistance to the force of the current, so that only the necessary current is diverted to each instrument, thereby as many copies as desired of a message may be made on one main line, and of nearly uniform character. I also arrange a local battery within this shunt or derived circuit, placing its poles in such a manner that when the main current has ceased to flow a reverse current from the local battery is made to circulate within the derived circuit, the action of which is to clear the apparatus or shunt of the lateral or secondary current, which is the cause of the characters being drawn out so as to render them illegible.

It is to be borne in mind that the mark in a chemical telegraph is in consequence of the decomposition of the materials employed under a positive current passing from the stylus, the reverse current producing no mark.

In the drawing the arrangement of the parts and connections at the different stations is illustrated.

Let $a$ represent the battery; $b$, the finger-key or equivalent; and $c$, the ground-connection at one station; $d$, the line-wire passing to the stations E F, or to any number of stations; and $g$, the distant ground-connection.

At station E I have shown a resistance-coil, $h$, in the main line that causes the pulsation to separate, a portion passing by the circuit $i$, through the stylus $o$ and chemical paper in the instrument and returning to the main line $d$, thence proceeding with the pulsation, passing through $h$ to the distant station; and by proportioning the resistance in the coil $h$ to the strength of the current the pulsation necessary will be deflected through the shunt or derived circuit. Several stations may have the connections thus arranged.

At station F the resistance-coil $h$ is introduced for the same purpose; but the battery $l$ is also employed. This battery is in the shunt, and the connections through the main line and shunt form a local circuit, with the positive pole toward the chemical paper; and hence the stylus is negative, and produces no action on the paper.

The main circuit, passing through the derived circuit, neutralizes the action of the local battery and transmits through the chemical paper sufficient current over and above that of the local battery to produce the character; but when that pulsation ceases the battery $l$ comes into action and throws a reverse current on the stylus, rendering the mark sharp instead of attenuated.

The coil $h$ is constructed so as to produce the necessary resistance; but I prefer to make use of an adjustable coil or resistance, so that the derived circuit may be regulated as required.

I claim as my invention—

1. A derived circuit or shunt in the main circuit, in combination with a chemical decomposing telegraphic apparatus, substantially as set forth.

2. A local battery within the divided circuit, in combination with decomposing chemical telegraphic apparatus, for the purposes substantially as set forth.

3. A series of derived circuits in one main circuit, in combination with chemical decomposing telegraph apparatus, as set forth.

4. An adjustable resistance placed in the main line, in combination with the derived circuit and chemical decomposing apparatus, substantially as set forth.

Signed by me this 11th day of June, A. D. 1870.

MARSHALL LEFFERTS.

Witnesses:
CHAS. H. SMITH,
GEO. T. PINCKNEY.